United States Patent Office 3,449,318
Patented June 10, 1969

3,449,318
HYDROXYALKYLATION OF (A) POLYHYDRIC ALCOHOLS USING HYDROGEN FLUORIDE CATALYST AND (B) DEXTROSE
Claris D. Roth, Robert G. Short, and Charles S. Nevin, Decatur, Ill., assignors to A. E. Staley Manufacturing Company, Decatur, Ill., a corporation of Delaware
No Drawing. Filed Nov. 21, 1966, Ser. No. 595,566
Int. Cl. C08b 19/04; C07c 43/00
U.S. Cl. 260—209                    13 Claims

ABSTRACT OF THE DISCLOSURE

Hydroxyalkylation of (A) polyhydric alcohols using a hydrogen fluoride catalyst and (B) of dextrose melts, prepared by dissolving dextrose monohydrate in its water of hydration.

---

This invention relates to a process of preparing polyether polyols which comprises reacting a polyhydric alcohol with an alkylene oxide using a hydrogen fluoride catalyst. More particularly, this invention relates to a process of preparing polyether polyols which comprises reacting dextrose with propylene oxide using a hydrogen fluoride catalyst.

The literature is replete with references describing the preparation of polyether polyols, particularly those suitable for the preparation of rigid polyurethane foams. However, these processes have various drawbacks, particularly when a saccharide having a reducing group is employed. For example, U.S. Patent 3,085,085, U.S. Patent 3,190,927 and British specification 1,008,121 indicate that polyhydric alcohols, which are solid at ambient temperatures, cannot be efficiently and rapidly hydoxylated unless the solid polyhydric alcohol is liquefied. These references indicate that (1) liquefying solid polyols by heating prior to hydroxyalkylation is not a suitable solution to the problem since polyols undergo partial decomposition as they melt and (2) dissolving the polyhydric alcohol in water is undesirable since alkylene oxides react with water to form glycols.

British specification 1,016,589 indicates that alkaline materials, such as sodium hydroxide, trimethyl amine, etc., which have been suggested as being suitable catalysts for the hydroxyalkylation of saccharides, are not suitable for the hydroxyalkylation of saccharides having a reducing group. When reducing sugare are employed as the starting materials, a marked decomposition of the saccharide occurs at the reaction temperatures necessitated by the use of the alkaline catalysts. In order to avoid this decomposition and discoloration of the reaction product, it has been customary to convert the reducing group into a nonreducing group by glycosidation or hydrogenation.

British specification 1,016,589 indicates that reducing saccharides can be reacted directly with alkylene oxides in the presence of a liquefying agent without discoloration by using a boron trihalide catalyst, such a boron trifluoride complex. The boron trihalide is apparently much more active than the conventional alkaline catalysts. For example, the hydroxypropylation of 1 mole of dextrose using a boron trifluoride complex can be completed in about six hours at about 120° C. too 140° C. at atmospheric pressure while an alkaline catalyzed reaction requires about sixteen hours at about 170° C. to 190° C. in a pressure reactor. Alkaline catalyzed reaction are normally carried out in pressure equipment.

Although the boron trihalide catalysts have the above advantages, they have certain drawbacks. As indicated above, the boron trihalide catalyzed reaction must be carried out using a liquefying agent. Attempts by applicants to hydroxypropylate molten anhydrous dextrose in the absence of a liquefying agent have been relatively unsuccessful, since the reaction mass balls up into an unstirable mass shortly after the start of the hydroxypropylation reaction. Even when a liquefying agent is employed, the resultant polyether polyol is more viscous than products prepared using other catalyst systems. This is undesirable since the principal use of polyether polyols is in the production of urethane foams, where processors prefer to use polyether polyols having as low a viscosity as possible. It is believed that the balling up and higher viscosity of these polyether polyols is due to the boron trihalide acting in its known capacity as a complexing agent or as a catalyst for the autocondensation and glycosidation of reducing saccharides. Further, unless adequate precautions (liquefying agent and low temperature) are taken, the boron trihalide tends to char reduced sugars.

The general object of this invention is to provide a new method of preparing polyether polyols. A second object of this invention is to provide a rapid method for the production of low viscosity polyether polyols from reducing saccharides without marked discoloration. Another object of this invention is to provide a rapid method for the production of low viscosity polyether polyols from reducing saccharides, without marked discoloration, which does not require the use of pressure equipment. Still another object of this invention is to provide a rapid method for the production of low viscosity polyether polyols from reducing saccharides without using a liquefying agent. Other objects will appear hereinafter.

We have now found that the objects of this invention can be attained by reacting a fluid reducing saccharide composition with an alkylene oxide using a hydrogen fluoride catalyst. This process proceeds rapidly even at atmospheric pressure, to form light colored polyether polyols of lower viscosity than polyether polyols prepared with boron trihalide catalysts. For example, dextrose can be hydroxypropylated under substantially anhydrous conditions using a hydrogen fluoride catalyst in about one-half to two-thirds the time required with boron trifluoride to form a pale-yellow polyether polyol having about seventy-five percent the viscosity of the boron trifluoride catalyzed product.

The reducing saccharide compositions useful in this invention for the preparation of rigid urethane foam precursors include essentially pure pentoses and hexoses, such as xylose, glucose (dextrose), fructose, galactose, maltose, lactose, maltotriose, maltotetraose, etc.; mixtures of reducing saccharides, such as invert sugar, starch hydrolyzate products sold as corn syrup, etc.; mixtures of one or more reducing saccharides with up to 50 percent by weight (equal parts by weight), preferably 1 to 20 percent by weight, of one or more nonreducing polyhydric alcohols having at least three hydroxyl groups which is liquid at atmospheric pressure at a temperature of about 140° C., such as glycerol, sorbitol, 1,1,1-trimethylol ethane, 1,1,1-trimethylol propane, ribitol, 1,2,4-butanetriol, 1,2,6-hexanetriol, hydroxypropylated reducing saccharide having substantially no aldehyde groups, etc.; and one of the aforementioned reducing saccharide compositions with up to 10 percent by weight water. If desired various derivatives having aldehydic groups, such as alkylated glucose and phosphorylated starch hydrolysis products can be used.

Dextrose is the preferred reducing sugar because of its low cost, availability and excellent processing characteristics. Whereas anhydrous dextrose decomposes on heating, commercially available dextrose monohydrate can be converted into a substantially anhydrous fluid state ideal for hydroxyalkylation without decomposition of the dextrose by (1) dissolving the dextrose monohydrate in its water of hydration at an elevated temperature and (2) distilling off the water of hydration. The substantially anhydrous dextrose melt remains fluid (does not crystallize or solidify) if the melt is maintained at 108° C., or at slightly lower temperatures in the presence of one of the aforementioned liquid or low melting nonreducing polyhydric alcohols containing at least three hydroxyl groups. While the polyhydric alcohol can be added to either the dextrose monohydrate or the liquid anhydrous dextrose melt, the former technique is preferred since water, which is usually present in the nonreducing polyhydric alcohol, is removed by distillation with the dextrose water of hydration.

Since the hydroxyalklation rate decreases as the concentration of water in the polyhydric alcohol composition increases, it is preferred to use polyhydric alcohol compositions containing as little water as possible. For example, other things being equal, a substantially anhydrous fluid dextrose composition can be hydroxypropylated in about seventy-five percent the time required for a dextrose composition containing five percent by weight water. However, the hydroxypropylation rate of the dextrose composition containing five to ten percent by weight water with hydrogen fluoride is markedly more rapid than when an alkaline catalyst is used under optimum reaction conditions.

One or more 1,2-alkylene oxides, such as ethylene oxide, propylene oxide, 1,2-butylene oxide, butadiene monoxide, cyclohexene oxide, styrene oxide, epichlorohydrin, etc. can be used in a concentration of about 3 to 20 moles, preferably 6 to 10 moles, per mole of polyhydric alcohol to prepare urethane foam precursors. Of these, propylene oxide is preferred because of its low cost, reactivity and moderate vapor pressure at room temperature. When the preferred concentration of propylene oxide is used with reducing saccharides, essentially nonreducing hydroxypropylated ethers are formed having a hydroxyl number of about 350 to 600, which are ideal for the preparation of rigid polyurethane foams. If desired, as little as 1 mole of alkylene oxide per mole of polyhydric alcohol, can be used in order to prepare ethers suitable for use as concrete water reducing agents or foundry core binders.

The hydrogen fluoride catalyst, as a gas or dissolved in a polar solvent, can be added in a concentration of 0.01 to 0.20 mole, preferably 0.04 to 0.10 mole, per mole of polyhydric alcohol. For handling convenience, it is preferred to use relatively concentrated, commercially available, aqueous hydrogen fluoride. It is desirable to use hydrogen fluoride solutions having as little water as possible, since, as pointed out above, the hydroxyalkylation rate decreases as the concentration of water in the reaction mass increases.

In somewhat greater detail our invention comprises reacting a fluid polyhydric alcohol composition comprising at least 50 percent by weight of a reducing saccharide with an alkylene oxide using a hydrogen fluoride catalyst. The fluid polyhydric alcohol composition is formed by dissolving the reducing saccharide in water and/or a nonreducing polyhydric alcohol in the manner described above for dextrose monohydrate. If desired, the water content of the polyhydric alcohol composition can be reduced by vacuum distillation. The fluid polyhydric alcohol composition can be maintained at from about 50° C. to 200° C., with the minimum temperature being dependent upon the solidification temperature of the composition. In general, it is preferred to maintain the fluid polyhydric alcohol composition at a temperature of about 100° C. to 130° C., with about 110° C. to 120° C. being best. Above about 130° C. the reducing saccharide tends to brown, while below about 100° C. the reaction tends to be markedly slower. The reduced reaction rate is believed to be due to the higher viscosity of the reducing saccharide at lower temperatures.

The catalyst and alkylene oxide are added separately to the fluid polyhydric alcohol composition. In general, it is preferred to add the alkylene oxide in a continuous stream and the catalyst incrementally, when needed to maintain the reaction.

The reaction can be carried out rapidly at atmospheric pressure or in a pressure reactor, if desired. In either case the reaction may be blanketed with an inert gas, such as nitrogen. However, such precautions are not necessary.

Although the polyether polyols of this invention can be used without purification, it is usually preferable to remove volatiles, such as water or low molecular wieght glycols by vacuum distillation. This distillate amounts to only 0.5–0.8 weight percent of the product. It has been found that residual hydrogen fluoride catalyst or its by-products remaining in the polyether polyol do not interfere with the chemical reactions involved in the production of polyurethane foams.

While this invention is particularly useful for the preparation of polyether polyol precursors for rigid urethane foams from reducing saccharides, the hydrogen fluoride catalyst of this invention can be used in the same manner to catalyze the hydroxyalkylation of (1) mixtures of from 0.1 to 50 percent by weight dihydric alcohol, such as ethylene glycol, propylene glycol, diethylene glycol, etc., and from 99.9 to 50 percent by weight reducing saccharide or (2) one or more nonreducing polyhydric alcohols, such as sucrose, glycerol, pentaerythritol, methyl glucoside, ethylene glycol, diethylene glycol, etc. In general polyether polyols prepared from polyhydric alcohol compositions containing dihydric alcohols are best suited for the preparation of flexible urethane foams while those prepared from compositions containing essentially no dihydric alcohol are best suited for the preparation of rigid urethane foams.

The following examples are merely illustrative and should not be construed as limiting the scope of this invention. In the examples, viscosity was determined at 25° C., on a Brookfield RVT viscometer and the hydroxyl number is in mg. KOH/g., determined by an isocyanate method.

Example I

One mole of dextrose monohydrate was melted at 120° C. in a suitable reactor. After the water of hydration was removed by distillation at 120 to 145° C. at 20 to 25 mm. Hg, the substantially anhydrous liquid dextrose was cooled to about 115° C. and the pressure increased to atmospheric. About 0.025 mole of 70 percent aqueous hydrogen fluoride was mixed with the liquid dextrose, followed by about 7 moles of propylene oxide, which was added gradually over a period of about 3½ hours to the reaction vessel while maintaining the exothermic reaction at 110 to 115° C. Midway through the propylene oxide addition, an additional 0.04 mole of 70 percent aqueous hydrogen fluoride was added. After the reaction was complete a small amount of volatiles (0.65 weight percent) was removed by distillation at 110° C. and 20 to 25 mm. Hg. The clear pale-yellow liquid had a viscosity of 35,000 cp. and a hydroxyl number of 485.

By increasing the total quantity of propylene oxide to 8.5 moles, the viscosity of the product was reduced to 15,000 cp. and the hydroxyl number decreased to 415.

Example II

Six-tenths of a mole (119 g.) of dextrose monohydrate and 3.08 grams glycerol were melted together at 120° C., dehydrated and hydroxypropylated in the manner described in Example I using about 0.044 mole of 70 percent aqueous hydrogen fluoride and 5.0 moles propylene oxide. The light yellow product formed after hydroxyalkylation for two and one-half hours had a viscosity of 22,500 cp. and a hydroxyl number of 442.

When this example was repeated using about 4.5 moles of propylene oxide, the polyether had a viscosity of 34,400 cp. and a hydroxyl number of 475.

Example III

Six-tenths of a mole of dextrose monohydrate, 2.10 grams glycerol and 5.40 grams Sutro-100 (a commercial mixture of $C_3$-$C_6$ polyhydric alcohols) were melted together at 120° C., dehydrated and hydroxypropylated in the manner described in Example I using 0.042 mole of 70 percent aqueous hydrogen fluoride and 5.1 moles propylene oxide. The light yellow product formed after hydroxyalkylation for two and two-tenths hours had a viscosity of 17,800 cp., a hydroxyl number of 444, an acidity of 2.2 mg. KOH/g., and a water content, by Karl Fischer analyses, of 0.15 weight percent.

Example IV

This example illustrates that hydrogen fluoride is an excellent hydroxyalkylation catalyst for nonreducing polyhydric alcohols. After 105 grams of liquid Sutro-100 was heated to 115° C. and dehydrated, 0.044 mole of 70 percent aqueous hydrogen fluoride and 4.95 moles propylene oxide were added in the manner described in Example I. The light yellow product formed after hydroxyalkylation for two and two-tenths hours had a viscosity of 7,500 cp. and a hydroxyl number of 495.

Since many embodiments may be made of this invention, and since many changes can be made in the embodiments described, the foregoing is to be interpreted as illustrative only, and the invention is defined by the claims following hereafter.

We claim:
1. The process of preparing a polyether polyol, which comprises reacting a fluid polyhydric alcohol composition with at least one alkylene oxide containing from 2 to 8 carbon atoms selected from the group consisting of ethylene oxide, propylene oxide, 1,2-butylene oxide, butadiene monoxide, cyclohexene oxide, styrene oxide, and epichlorohydrin using a catalytic amount of a hydrogen fluoride catalyst.

2. The process of preparing a polyether polyol, which comprises reacting a fluid composition containing at least 50 percent by weight of a reducing saccharide with at least one alkylene oxide containing from 2 to 8 carbon atoms selected from the group consisting of ethylene oxide, propylene oxide, 1,2-butylene oxide, butadiene monoxide, cyclohexene oxide, styrene oxide, and epichlorohydrin using a catalytic amount of a hydrogen fluoride catalyst.

3. The process of claim 2, wherein said fluid composition comprises from 1 to 20 percent by weight of a nonreducing polyhydric alcohol, which is liquid at 140° C., and from 99 to 80 percent by weight of a reducing saccharide.

4. The process of claim 3, wherein said alkylene oxide is propylene oxide.

5. The process of claim 3, wherein said process is carried out under substantially anhydrous conditions.

6. The process of claim 3, wherein said reducing saccharide is dextrose.

7. The process of claim 6, wherein said alkylene oxide is propylene oxide in a concentration of 3 to 20 moles per mole of polyhydric alcohol.

8. The process of preparing a polyether polyol, which comprises the steps of melting dextrose monohydrate, vacuum distilling the water of hydration from salt melt to form a substantially anhydrous fluid polyhydric alcohol composition and reacting said fluid composition with at least one alkylene oxide containing from 2 to 8 carbon atoms selected from the group consisting of ethylene oxide, propylene oxide, 1,2-butylene oxide, butadiene monoxide, cyclohexene oxide, styrene oxide, and epichlorohydrin using a catalytic amount of a hydrogen fluoride catalyst.

9. The process of claim 8, wherein said alkylene oxide is propylene oxide in a concentration of 3 to 20 moles per mole of polyhydric alcohol.

10. The process of claim 8, wherein said fluid substantially anhydrous polyhydric alcohol composition comprises from 1 to 20 percent by weight of a nonreducing polyhydric alcohol, which is liquid at 140° C., and from 99 to 80 percent by weight dextrose.

11. The process of claim 10, wherein said alkylene oxide is propylene oxide in a concentration of 6 to 10 moles per mole of polyhydric alcohol.

12. The proces of claim 10, wherein said alkylene oxide is reacted at atmospheric pressure.

13. In the process of hydroxyalkylating a fluid dextrose composition with at least one alkylene oxide containing from 2 to 8 carbon atoms selected from the group consisting of ethylene oxide, propylene oxide, 1,2-butylene oxide, butadiene monoxide, cyclohexene oxide, styrene oxide, and epichlorohydrin using a catalytic amount of a hydroxyalkylation catalyst, the improvement which comprises forming a fluid dextrose composition by the steps of melting dextrose monohydrate and vacuum distilling the water of hydration from said melt to form a substantially anhydrous composition.

References Cited

UNITED STATES PATENTS

| 2,900,268 | 8/1959 | Rankin et al. | 260—209 |
| 2,956,963 | 10/1960 | Baird | 260—209 |
| 3,202,620 | 8/1965 | Merten et al. | 260—209 |
| 3,265,641 | 8/1966 | Wisner et al. | 260—209 |
| 3,277,076 | 10/1966 | Yotsuzuka | 260—209 |
| 3,305,535 | 2/1967 | Merten et al. | 260—209 |
| 3,324,108 | 6/1967 | Moller et al. | 260—209 |

LEWIS GOTTS, *Primary Examiner.*

J. R. BROWN, *Assistant Examiner.*

U.S. Cl. X.R.

260—210, 233.3, 615